Figure 5:
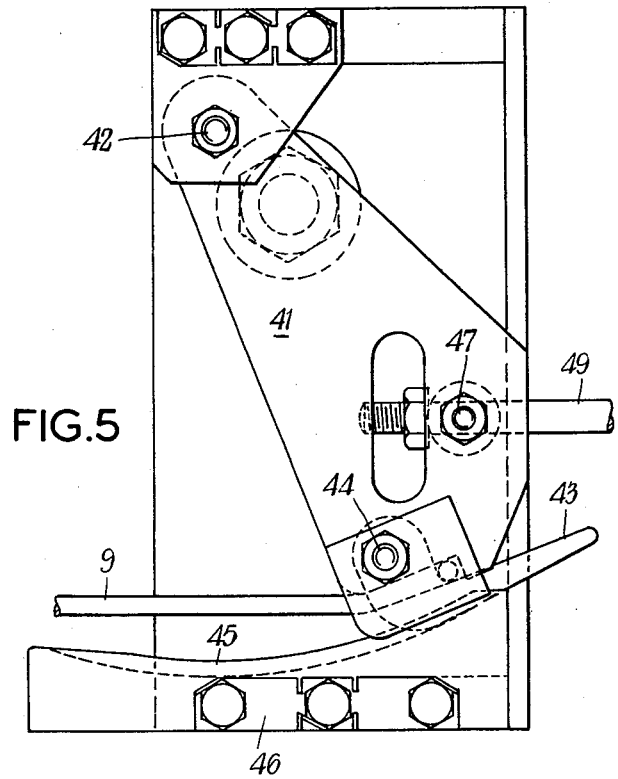

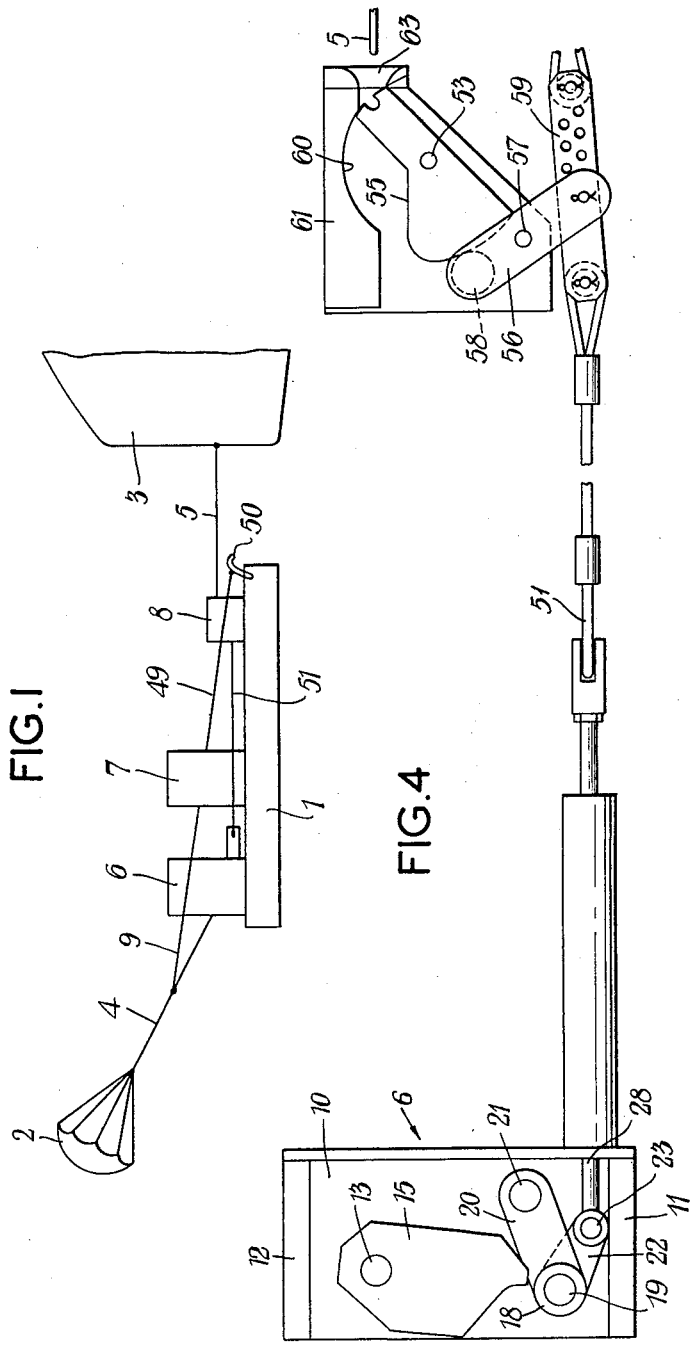

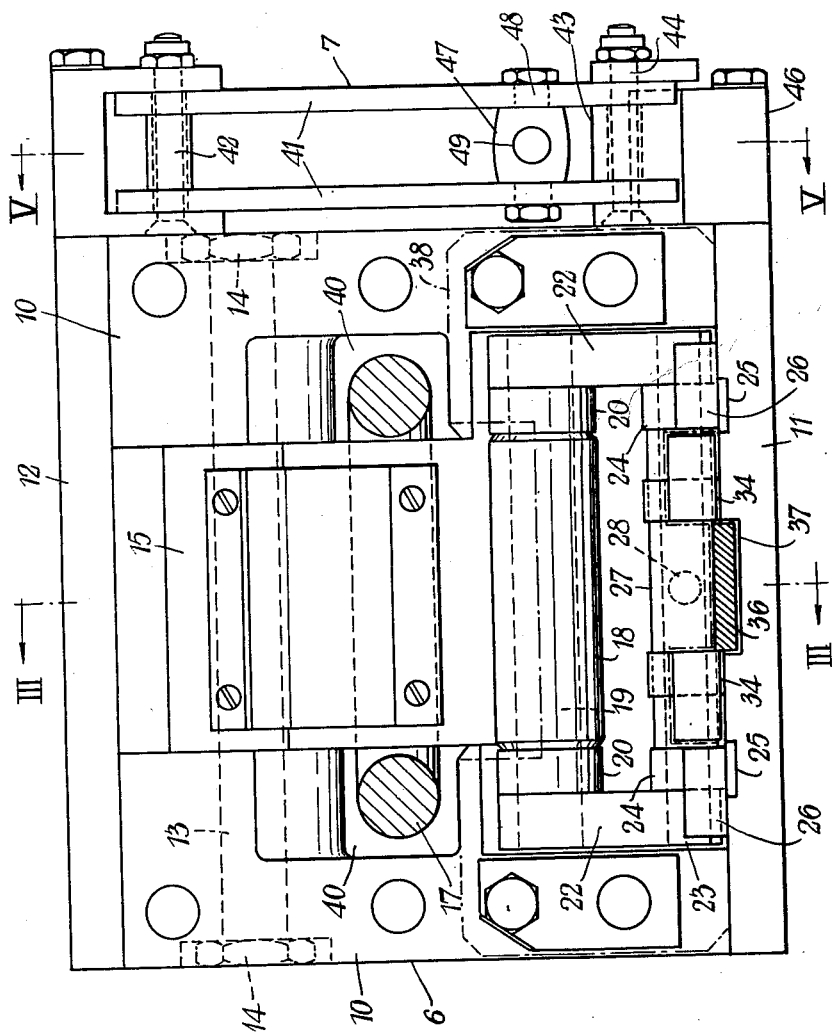

Nov. 26, 1963   L. R. LUCHFORD ETAL   3,112,090
RELEASE DEVICES
Filed Nov. 30, 1960   5 Sheets-Sheet 3
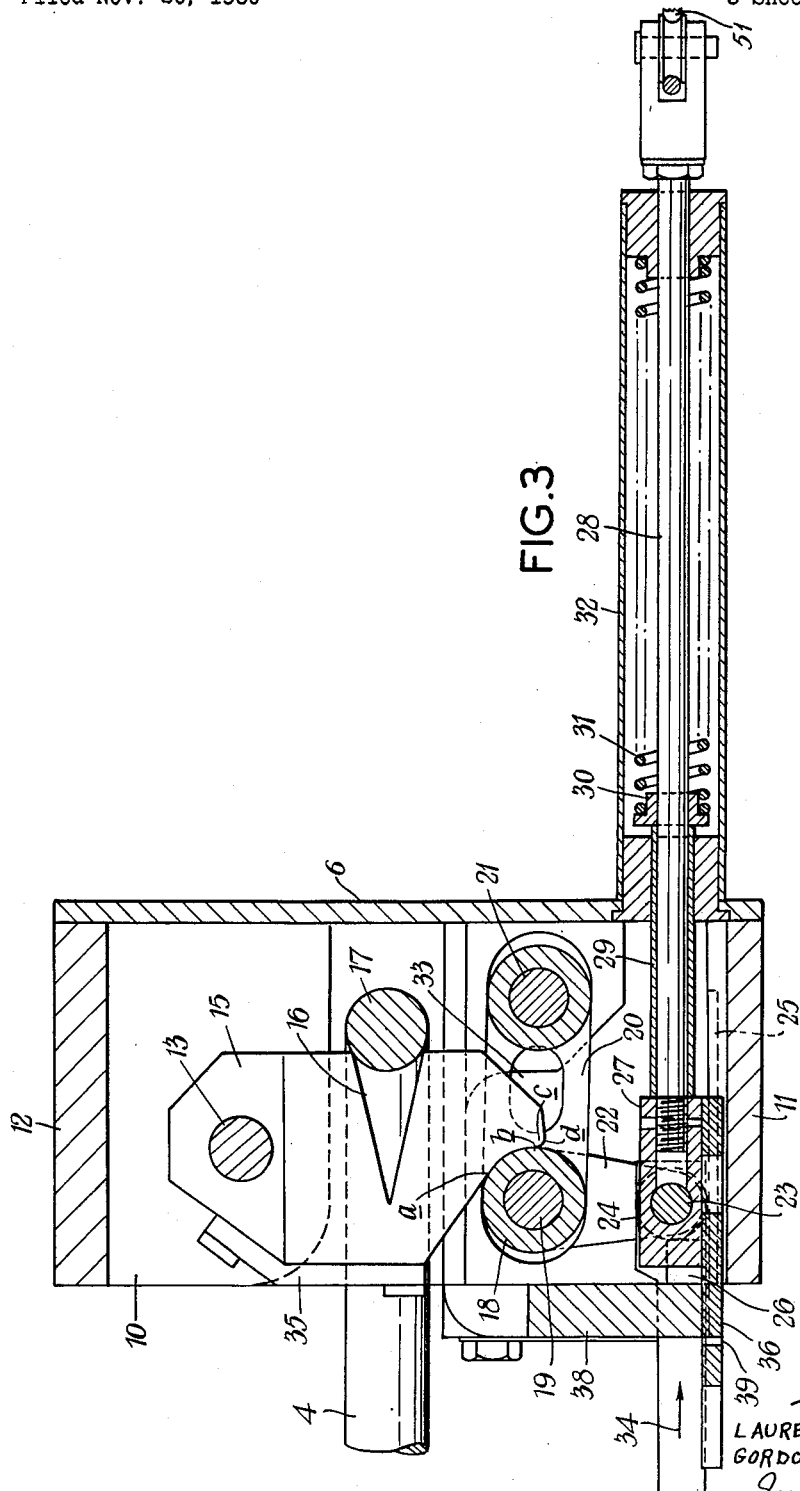
INVENTORS
LAURENCE R. LUCHFORD
GORDON L. RATCLIFFE
*Imrie & Smiley*
Attys.

INVENTORS
LAURENCE R. LUCHFORD
GORDON L. RATCLIFFE

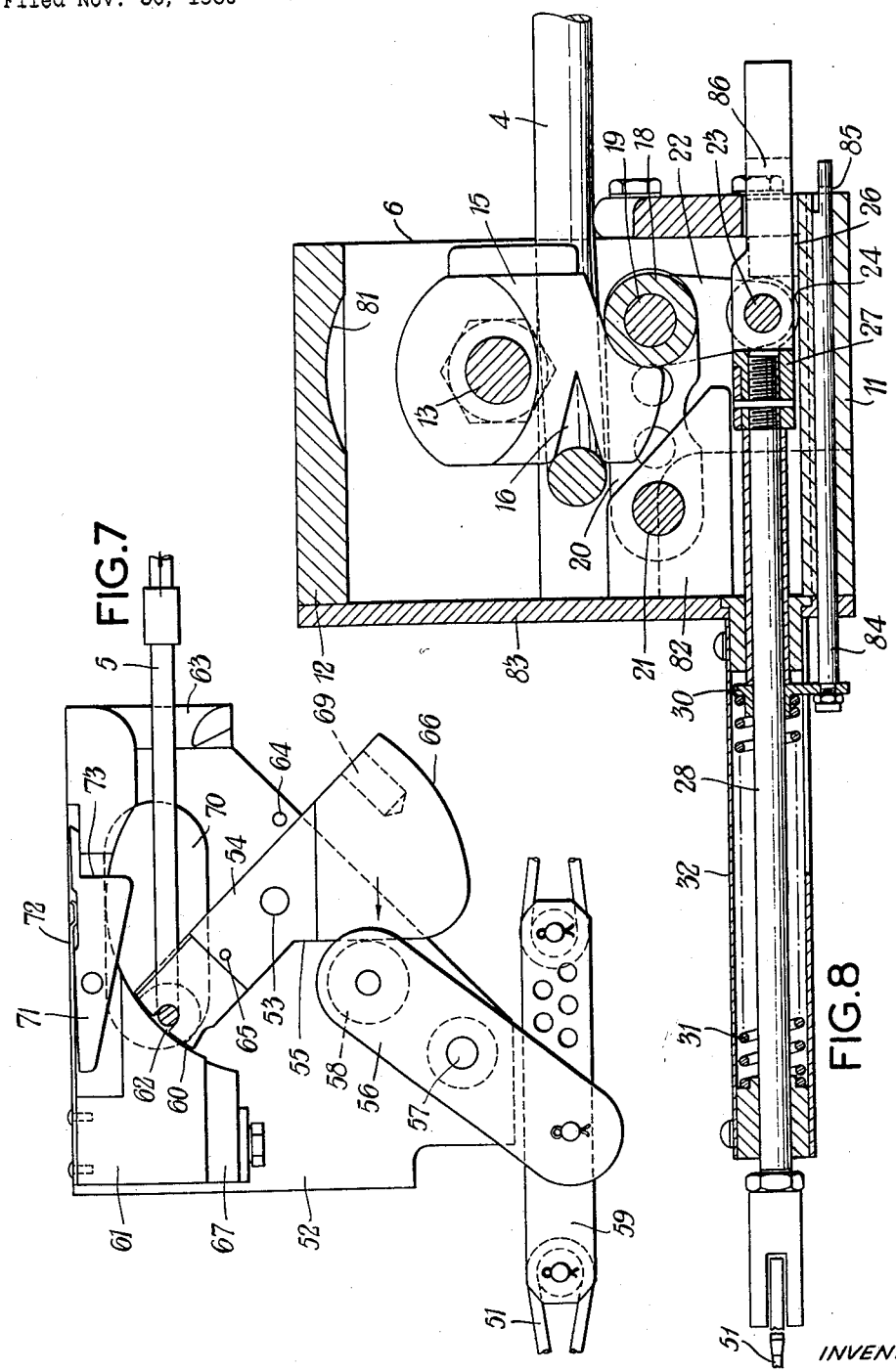

United States Patent Office 3,112,090
Patented Nov. 26, 1963

3,112,090
RELEASE DEVICES
Laurence Richard Luchford and Gordon Leslie Ratcliffe, East Molesey, England, assignors to Trianco Limited, East Molesey, England
Filed Nov. 30, 1960, Ser. No. 72,625
Claims priority, application Great Britain Dec. 10, 1959
20 Claims. (Cl. 244—138)

This invention relates to devices for releasing cables or the like from articles to which they are attached and particularly for releasing such cables whilst they are under heavy strain.

A particular application of the device is to the dropping of articles from aircraft where the article is extracted from the aircraft by an extractor parachute which is then released from the article other parachutes being brought into use to support the articles as it descends.

A device (hereinafter referred to as a transfer release device) according to the invention comprises a latch pivoted at one end and movable about the pivot to allow a cable engaged therewith to be released, means at one end of a link engaging the other end of the latch to prevent such movement, this link being pivoted at its other end and being supported in the engaged position by a support member, and means to withdraw this support member to allow the link to move out of engagement with the latch.

From another aspect, the invention provides a transfer release device in which a latch is pivotable by the tension of a cable engaged therewith to a position in which the cable disengages itself from the latch and is restrained from such movement by engagement with a pivoted link supported by a crutch member, pivoted to the link, and having means to move the crutch member about its pivotal connection with the link to withdraw the link from engagement with the latch.

From yet another aspect a transfer release device in accordance with the invention comprises a latch about which a cable may be looped, pivoted at one end and shaped at the other end to engage a latching roller mounted on a pivoted link and to extend slightly beyond the line joining the center of the roller to the pivot of the link, support members pivoted about the axis of the roller and supporting the link with the latching roller engaged with the latch, abutment means engaging the other ends of the support members to retain the roller in engagement with the latch and means to withdraw these ends from the abutment means to allow the link to pivot and disengage the roller from the latch.

Means may be provided to release the article from its support when the cable is tensioned, for example to release an article from its anchorage in an aircraft when the extractor parachute opens and tensions the extractor cable. Such means (hereinafter referred to as aircraft release operating devices) may be associated with the transfer release device which releases the extractor cable and may comprise a pivoted latch having a toe portion sliding over an arcuate shaped block, a line attached at one end to the extractor cable being looped around this latch and slipping off when the toe is moved clear of the block. The latch is connected by suitable linkage to means releasing catches anchoring the article to its support.

The transfer release is operated by a device (hereinafter referred to as an operating disconnect device) operated by a line (for example, connected to the aircraft) which is itself released from the operating disconnect device when the cable release has been operated. This operating disconnect device, according to a further feature of the invention, comprises a pivoted lever arm grooved at one end to receive a line retained in the groove by an arcuate block over which this end of the lever slides, the lever being formed at its other end as a cam surface, and a roller engaging this cam surface carried at one end of a pivoted link of which the other end is connected to the operating means for a transfer release device. A pull on the line rotates the lever so that its cam surface causes rotation of the link to operate the transfer release device, and the lever rotates until its end moves clear of the arcuate block and the line slips out of the groove.

Figure 6:
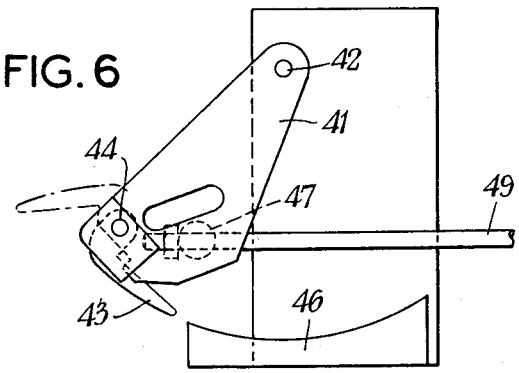

Other parts of the invention are embodied in the preferred forms which will now be described in some detail by way of example with reference to the accompanying drawings in which:

FIG. 1 is a diagram showing the extraction of a platform from an aircraft,

FIG. 2 is a front view of a device combining a transfer release and an aircraft release operating device, FIG. 3 is a section on line III—III of FIGURE 2 showing the transfer release in the engaged position, FIG. 4 is a diagram showing the transfer release and the operating disconnect device in the release position, only essential parts being shown, FIG. 5 is a section on line V—V of FIG. 2 showing the aircraft release operating device in the engaged position, FIG. 6 is a view similar to FIG. 5 with the device in the release position, only essential parts being shown, FIG. 7 is a cross section of operating disconnect device in the engaged position, FIG. 8 is a view similar to FIG. 3 (but viewed from the other side) of a modified form of transfer release.

These forms will be described in relation to the specific operation of extracting a loaded platform 1 by parachute 2 from an aircraft 3, and subsequently releasing the extractor parachute cable 4 from the platform. Such an operation involves also the release of catches anchoring the platform to the aircraft and the casting off of a connection 5 between the aircraft 3 and the platform 1 used to cause the release of the extractor parachute 2. For convenience, the device releasing the extractor parachute cable 4 from the platform will be hereinafter referred to as a "transfer release" 6, the device releasing the anchorage of the platform will be referred to as an "aircraft release operating device" 7 and the device disconnecting the line 5 through which the transfer release 6 is operated will be referred to as the "operating disconnect" 8.

It is essential that the transfer release 6 should be capable of withstanding, without accidental or premature release, the high shock loads imposed upon it when the extractor parachute 2 opens to apply extraction effort to the platform 1 and yet be capable of being operated with a minimum of effort to release from itself the extractor cable 4 attached to the extractor parachute 2 in spite of the load imposed upon it. For example the extraction effort may reach 60,000 lbs. pull but the effort to operate the release should be less than say 300 lbs.

The transfer release 6 comprises a body which is secured to the platform by a number of bolts and has two side plates 10, a base plate 11 and a top plate 12. A spindle 13 extends between the two side plates 10 with its axis parallel to the base plate 11 and is secured by nuts 14 on its ends preventing the body spreading under high loading on the spindle.

A latch 15 is free to pivot at one end about the spindle 13 and is formed with a groove 16 intermediate its ends in which a grommet 17 on the parachute cable 4 may be engaged, this grommet slipping off the latch 15 when the latch pivots in the direction of the pull of the cable.

The latch 15 is prevented from pivotal movement by engagement of its other end with a latching roller 18, which is freely mounted on a spindle 19 carried by side links 20 hinged to the body about pivots 21. On the spindle 19 are also pivotally mounted a pair of crutches 22 which are substantially at right angles to the side links 20 and which are connected at their other ends by a cross-spindle 23. On this cross-spindle are rollers 24 which run on path strips 25 inserted into the bottom plate 11 of the body. In the set position, the latching roller 18 is supported from the bottom plate 11 of the body by these crutches 22 with its center a small distance (for example 1/16 inch) further from the base plate than is the axis of the pivots 21 of the side links 20. Also in this position the cross-spindle 23 is positioned so that the rollers 24 on it are thrust against stops 26 with the axis of the cross-spindle 23 a short distance (say 1/16 inch) forward from the axis of the latching roller 18.

The cross-spindle can be drawn backwardly (that is in a direction away from the pull of the cable and to the right in FIG. 3) by a cross head 27 mounted on the cross-spindle between the rollers, an operating rod 28 being secured to the cross head. A spacer tube 29 carried by the cross head 27 surrounds the operating rod 28 and a thrust collar 30 is pushed against this tube 29 by a spring 31 housed in a cylinder 32 secured to the body. This spring 31 thrusts the rollers 26 on the cross-spindle 23 against the stops 26 to retain the device in latched position.

The profile of the latch 15 in contact with the latching roller 18 is designed to ensure uniform load bearing contact and to provide freedom of movement of the latching roller 18 as it passes off the end of the latch 15. This profile comprises a circular arc engaging the latching roller and extending from a point $a$ behind the center of the roller 18 to a point $b$ on the line joining the center of the roller 18 to the axis of the pivots 21 of the side links 20, beyond which is about 1/16 inch of land $c$ which is tangential in relation to the path described by the latch roller 18 about the pivots 21 of the side links 20. This land blends into a curve $d$ of small radius (about 1/16 inch) on the extreme edge of the latch. This profile is of great importance. If the land is such as to increase the radius as measured from the link axis to the outside diameter of the roller, the effort to release is considerably increased.

Under extraction load conditions of say 60,000 lbs. applied to the waist of the latch (at the groove 16), approximately half of this is sustained by the latch 15 against the latching roller 18 and transmitted through the side links 20 to the body. This load tends to thrust the side links 20 downwards into a position parallel with the base plate 12 thereby applying a load of say 1185 lbs. through the crutches 22 on to their rollers 24. The rollers 24 thrust against the stops 26 with a load of about 46 lbs. and support the roller positively in position to retain the load.

When the operating rod 28 is pulled against the spring 31, a relatively low effort in the region of 315 lbs. is sufficient to withdraw the rollers 24 and crutches 22 from beneath the latching roller 18 which then rolls across the profile of the latch 15. The latch 15 then swings outwardly (clockwise in FIG. 3) under the pull of the extractor cable 4 attached to the extractor parachute and the grommet 17 on the cable slips off the latch 15 to release the cable.

The latch, spindles, roller and path strips are all of high tensile materials hardened and ground to provide low friction and low rolling losses. The crutches and the crosshead are light weight high duty aluminum alloy to reduce to a minimum inertia loading when the equipment is quickly decelerated upon extraction from the aircraft. The spring is also calculated to reduce the effects of inertia loading, and assists to retain the latch in the latched position whilst at the same time its rate is sufficiently low as not to unduly increase the effort required to operate the release.

When the latch 15 is freed, the energy imparted to it by the high loading and rapid detachment of the grommet 17 forces the latching roller 18 violently downwards and damage could be caused by the sudden impact against a stop such as the upper base plate 12. The side links 20 are relieved at their center by apertures 33 to reduce the momentum and the crutches 22 are of light weight alloy for the same purpose. In addition, buffers 34 of suitable cushioning properties are introduced into the path of the latching roller to absorb this energy. These buffers 34 of synthetic rubber are hinged to the cross-spindle 23 within the connection to the cross head 27 and are drawn into the body when the cross head is operated. These buffers take up a position between the latching roller and the base plate so as to cushion the roller as it moves rapidly upon release.

The latch also swings violently upwards when released and to minimize damage, the latch carries a rubber or like buffer pad 35 on its forward face, this pad being interposed between the latch 15 and the top plate 12 so as to absorb the energy by compression and so also as to wedge against the underside of the top plate 12. In the modified form shown in FIG. 8 the latch 15 is arranged to rotate freely on its spindle 13 when the cable 4 is released, the underside of the top plate 12 of the body being recessed at 81 so that the latch does not impact the top plate.

To ensure in the form of FIG. 3 that the latching roller 18 will positively leave the latch face, the cross head 27 and the rollers 24 on the cross-spindle 23 are restrained from lifting off the path strips 25 by a protruding hardened tongue 36 attached to the underside of the cross head. This tongue runs within a groove 37 in the base plate 11 of the body and bears against the lower edge of a front plate 38 secured to the body, thereby preventing lifting of the cross head and ensuring that the latching roller runs off the face of the latch.

A sight hole 39 is drilled on the center line of this tongue 36, in such a position that when it is close up to the front plate 38, the cross head is properly set to retain the device in a positively latched position.

Alternatively as shown in FIG. 8 the cross head 27 may run beneath a protruding block 82 on the back plate 83 of the body and be restrained from lifting by this block. A rod 84 moving parallel with the cross head 27 may slide through a hole in the base plate 11 and this rod is drilled with a sight hole 85 which when aligned with the front plate indicates that the latch is properly set. A hole 86 may be drilled in the rubber buffer to expose this sight hole to view.

The side plates 10 of the body are grooved adjacent the groove 16 in the latch to accommodate the grommet on the extractor cable. These grooves 40 prevent the grommet from bearing upon the internal linkages of the device so as to interfere with the freedom of release and also guide the grommet to its seating groove on the latch.

A pad may be attached to the face of the latch to prevent incorrect positioning of the grommet behind the latch.

Means shown in FIGS. 2, 5 and 6 for operating a device 7 to release the loaded platform 1 from its anchorage in the aircraft 3 (or from some other form of support) are provided in association with the transfer release 6, such means being operated by a line 9 attached to the extractor cable 4. A pair of parallel links 41 are adapted to swing around an axle 42 at the side of the transfer release body and a foot 43 is pivoted on a bearing 44 between the two links 41 towards the end thereof. This foot runs within a radial groove 45 in a guide block 46 fixed to the side plate 10. A trunnion 47 is mounted in bearing 48 between the links, and to this trunnion is connected a rod or cable 49 connected adjustably to the aircraft release (indicated diagrammatically as hook 50 in FIG. 1) which retains the loaded platform.

The operating line 9 is looped around the foot 43 and when tension is applied to this line by the extractor cable 4, the links 41 are swung forward to operate the aircraft release and thereafter swing further forward until the end of the foot 43 passes beyond the groove 45 in the guide block. The operating line 9 then slips off the foot thus preventing overloads or damage to the equipment. A similar operating device may be provided on the other side of the transfer release to operate other aircraft releases if desired.

The transfer release is operated by a line 51 from an operating disconnect device 8 which is also mounted on the platform 1 and is itself operated by a static line 5 from the aircraft which line 5 is disconnected when the transfer release is operated.

The operating disconnect comprises a body 52, FIG. 7, on which is mounted about a pivot 53 an operating arm 54 formed at its end with a cam surface 55. A lever 56 also pivotally mounted on the body about a pivot 57 carries at its end a freely rotatable roller 58 which rides on this cam surface 55. To the other end of this lever is pivoted an adjustable connector 59 having a dead eye which carries a cable 51 attached to the operating rod 28 of the transfer release.

The other end of the operating arm 54 runs in close proximity to the arcuate face 60 of a retaining block 61 and has a radiussed groove 62 in its extreme end, this groove being closed by the retaining block.

A static line 5 secured at one end to the aircraft has at its other end a loop which passes through an oval mouth 63 in the body of the operating disconnect and is engaged in the radiussed groove 62, being retained therein by the block 61. A stop pin 64 prevents the lever arm swinging too far into the body which might allow the line to leave its groove and become jammed in the body.

After setting the operating disconnect, a shear wire 65 is passed through aligned holes in the body 52 and the operating lever 54 to prevent accidental or premature operation.

When the loaded platform 1 has been extracted from the aircraft 3 a sufficient distance, the static line 5 tensions, and exerts force to break the shear wire 65 and to rotate the operating lever 54. The cam surface 55 acts on the operating lever 56 bearing the roller 58 and pivots this to exert a force on the operating rod 28 of the transfer release. The cam surface 55 of the operating lever merges into a circular arc 66, so that having operated the transfer release, the lever 54 moves on in contact with the roller 58 thus reducing the load on the static line 5 which becomes detached when the groove 62 in which it is trapped passes beyond the arcuate face 60 of the guide block 61.

A rubber buffer 6 7is provided on the guide block against which the cam shaped end of the operating lever 54 abuts to prevent further movement of the operating lever.

To prevent the possibility of the operating lever 54 bouncing back after striking the buffer 67, a retaining latch 71 is provided. This comprises a pivoted latch 71 projecting into the path of the grooved end of the operating arm 54 which is pushed back against a leaf spring 72 to allow the arm to move forward. The latch has a steep face 73 which lies in the path of the operating arm 54 when this moves backward and prevents more than a limited movement in this direction.

A hole 69 in the side of the operating arm 54 permits the insertion of a tommy bar to lever the operating arm during setting operations. The sides of the body 52 act as guards whilst sight of the arm when engaging the static line is allowed through holes 70.

It will be understood that the invention is not restricted to the details of the preferred forms described by way of example which may be modified without departure from the broad ideas underlying them.

We claim:

1. A transfer release device comprising:
   a support body,
   a latch pivoted at one end to the support body and pivotable by the tension of a cable engaged therewith to a forward release position in which the cable disengages itself from the latch,
   a link hingedly secured to said support body and engaging the other end of the latch to restrain movement thereof to said release position,
   a crutch member pivotally secured at one end to said link,
   resilient bias means urging said crutch member in a direction to hold the link engaged with the latch for restraining its movement toward said forward release position, and
   means to move the crutch member about its pivoted connection with the link against said bias means so as to permit disengagement of the link from the latch.

2. A transfer release device as claimed in claim 1 wherein the means to move said crutch member includes an operating disconnect device comprising a pivoted lever arm grooved at one end to receive a line retained in the groove by an arcuate block over which this end of the lever arm slides, the lever being formed at its other end as a cam surface, and a roller engaging this cam surface carried at one end of a pivoted link of which the other end is connected to the said means to move the crutch member of said transfer release device, the arrangement being such that a pull on the line rotates the lever arm so that its cam surface causes rotation of said pivoted link to operate the transfer release device, and the lever arm rotates until its end moves clear of the arcuate block and the line slips out of the groove.

3. A transfer release device as claimed in claim 2 wherein the operating disconnect device has a stop limiting the movement of the lever arm relative to the arcuate block in the direction opposite to that in which the arm moves to release the line.

4. A transfer release device as claimed in claim 2 wherein the operating disconnect device has a shear wire passed through the lever arm and the body to retain the device in the closed position with the groove closed by the arcuate block.

5. A transfer release device as claimed in claim 2 wherein the operating disconnect device has a buffer against which the lever arm abuts on movement to release the line.

6. A transfer release device as claimed in claim 2 wherein the operating disconnect device includes means engaging the lever arm on movement in the direction opposite to that in which it moves to release the line, said means being removable from the path of the lever arm to allow setting of the device and being moved by the arm out of its path when the device is operated.

7. A transfer release device as claimed in claim 6 in which the said means comprises a spring pressed pivoted latch having a steep face lying in the path of the arm when this moves in the reverse direction.

8. A transfer release device according to claim 1 wherein
   said latch is shaped at its unpivoted end to engage a latching roller journaled on said link,
   said unpivoted end of the latch extending slightly rearwardly of a line joining the center of the roller to the hinge axis of the link,
   said crutch member being pivoted about the axis of said roller,
   fixed abutment means on said support body engaging the other end of the crutch member to retain the roller in engagement with the latch, and
   said means to move the crutch member acting to withdraw said other end of the crutch member from the fixed abutment means.

9. A transfer release device according to claim 8 in which
   said crutch member comprises a pair of crutch arms pivoted to the ends of said latching roller and joined at their said other ends by a cross spindle, and crutch rollers mounted on said cross spindle which in the link engaged position of the latch abut against said abutment means with the axis of the cross spindle slightly forward of the axis of the latching roller.

10. A transfer release device according to claim 9 in which said means to move the crutch member comprises a cross head mounted on said cross spindle and an operating rod secured thereto, and said resilient bias means includes a spring urging the cross head in a forward direction.

11. A transfer release device according to claim 9 in which a protruding tongue mounted on said cross spindle bears against the lower edge of a guide element fixed to said support body, whereby said spindle is restrained from lateral rising movement relative to said abutment means.

12. In apparatus for dropping a load withdrawing from an aircraft by an ejector parachute, the combination of a cable for securement of the ejector parachute looped on said latch of a transfer release device as claimed in claim 1 for releasing the parachute from the load after ejection, and an aircraft release operating device for releasing the load from the aircraft for ejection, said aircraft release operating device comprising a second latch pivoted at one end to said support body and having a foot pivoted to its other end and slidable along an arcuate block fixed to said support body, an operating line connected to said cable and retained on the second latch by the foot and the arcuate block, said foot pivoting about the second latch to release the operating line when the second latch is moved by tension in the line to a release location in which the foot clears the block, and means for connecting the second latch to aircraft catch means released by movement of the second latch to said release location.

13. The combination of claim 12 in which said second latch comprises a pair of parallel links connected by an axle about which said foot is swingable.

14. The combination of claim 12 in which said foot of the second latch runs in a radial groove in a guide block.

15. The combination of claim 12 in which said aircraft release operating device is mounted on the side of said transfer release device.

16. A transfer release device according to claim 8 in which the profile of the unpivoted end of said latch in contact with the latching roller is a circular arc extending from a peripheral point behind the center of the latching roller to a peripheral point on the line joining the center of the latching roller to the pivotal axis of the link, and a short land tangential to the path described by the latching roller about the pivotal axis of the link and blending into a curve of small radius on the extreme edge of the latch.

17. A transfer release device according to claim 8 in which the latch carries a resilient buffer pad which is interposed between the latch and the support body when the latch is in said forward release position and is thereby compressed to absorb the energy in the latch.

18. A transfer release device according to claim 8 in which said latch is free to rotate freely about the pivot axis of its pivoted end when released without impact with said support body.

19. A transfer release device according to claim 10 in which cushioning buffers are inserted in the path of the latching roller to absorb the energy thereof when the latch is released.

20. A transfer release device according to claim 19 in which the cushioning buffers are hinged to the cross spindle forwardly thereof and are drawn rearwardly into a position between the latching roller and said support body when the operating rod and secured cross head are moved rearwardly.

References Cited in the file of this patent

UNITED STATES PATENTS

| | | |
|---|---|---|
| 116,212 | Newcomb | June 20, 1870 |
| 235,099 | O'Brien | Dec. 7, 1880 |
| 2,732,246 | Bernhart | Jan. 24, 1956 |
| 2,774,560 | Johnson | Dec. 18, 1956 |
| 2,789,468 | Burns | Apr. 23, 1957 |
| 2,863,200 | Miller et al. | Dec. 9, 1958 |
| 2,870,510 | Morrow | Jan. 27, 1959 |
| 3,016,257 | White | Jan. 9, 1962 |
| 3,028,188 | Campbell | Apr. 3, 1962 |

FOREIGN PATENTS

| | | |
|---|---|---|
| 782,640 | Great Britain | Sept. 11, 1957 |